United States Patent [19]

König et al.

[11] Patent Number: 4,907,244
[45] Date of Patent: Mar. 6, 1990

[54] ELECTRIC REDUCTION FURNACE

[75] Inventors: Heribert König, Duisburg; Heinz Stark, Essen, both of Fed. Rep. of Germany

[73] Assignee: Mannesmann Aktiengesellschaft, Dusseldorf, Fed. Rep. of Germany

[21] Appl. No.: 367,556

[22] Filed: Jun. 19, 1989

[30] Foreign Application Priority Data

Jul. 27, 1988 [DE] Fed. Rep. of Germany ....... 3825984

[51] Int. Cl.$^4$ ............................................ H05B 7/144
[52] U.S. Cl. .................................................. 373/102
[58] Field of Search ................. 373/102, 104, 107, 41, 373/108, 47

[56] References Cited

U.S. PATENT DOCUMENTS 1,244,415  10/1917  Booth .................................. 373/102
3,949,151   4/1976  Kerton ................................ 373/108
4,406,008   9/1983  König et al. ...................... 373/102
4,821,284   4/1989  Janiak et al. ..................... 373/108

FOREIGN PATENT DOCUMENTS 3024223  1/1982  Fed. Rep. of Germany ...... 373/102

Primary Examiner—Roy N. Envall, Jr.
Attorney, Agent, or Firm—Cohen, Pontani & Lieberman

[57] ABSTRACT

An electric reduction furnace with a furnace vessel having a refractory lining and electrodes which are connected to a three-phase current power supply unit and which extend into the furnace vessel. In the region between, in each case, two first electrodes (21-22, 22-23, 23-21) and the wall of the furnace vessel, additional second electrodes (31-33) ae provided which form with each two of the first electrodes substantially isosceles triangles. The additional second electrodes (30-33) extend substantially parallel to the first electrodes (21-23) and are electrically connected to the furnace lining (14).

12 Claims, 3 Drawing Sheets

ELECTRIC REDUCTION FURNACE

FIELD OF THE INVENTION

The present invention relates to an electric reduction furnace having a furnace vessel with a refractory lining and electrodes which are connected to a three-phase current supply system and extend into the furnace vessel.

BACKGROUND OF THE INVENTION

Electric reduction furnaces of round construction have three electrodes which are arranged on a pitch circle and form the tips of a substantially equilateral triangle. In a cylindrically shaped furnace considerable dead spaces are present between every two adjacent electrodes and the wall of the furnace. Due to this arrangement of the electrodes, the electric reduction furnaces include, at the same time, zones on the furnace wall which are subjected, corresponding to the distance of the electrodes, to higher thermal stresses during the operation of the furnace.

With electric reduction furnaces of rectangular construction, the electrodes are arranged in a row. Furnaces of this type also have zones of high thermal stress, as well as dead spaces.

In electric reduction furnaces, the electrodes extend either into the melt or into the burden to a short distance above the melt. In the latter case, a so-called "dome formation" takes place during the melting process in the region between the tip of the electrode and the melt when the burden is charged separately, i.e. a dome of coarsely granular carbon which has separated out of the burden. A part of the electric current flows into the melt via the wall of the dome, which is electrically conductive.

With treated burden, such as pellets or briquettes, the separation of the burden does not take place to this extent, so that in this case, instead of the dome of carbon, electrically conductive banks of pellets or briquettes are produced between the electrodes.

Since all three electrodes are connected to the melt via domes or banks, a star-shaped connection from the standpoint of a wiring diagram, is present here.

The domes as well as the banks of the individual electrodes are, however, at the same time connected to each other. There is thus also a flow of current between the individual electrodes as a function of the corresponding phase of current at the time. From the standpoint of a wiring diagram, a delta connection is present here.

The same situation is present from the standpoint of a wiring diagram when the electrodes dip into a molten bath. The volumes of slag below the electrodes towards the furnace bath and between the electrodes form the current paths and thus bring about the heating mechanism.

Furnaces having the above-mentioned heating mechanism are employed in numerous steel plants.

An electric arc furnace is known from German Patent Application No. AS 1,050,464, in which the shape of the vessel of the furnace is adapted to the active regions of the individual electrodes. This embodiment has the disadvantage of the complicated shape of the mechanical part and the refractory part of the furnace.

From German Pat. No. 973,715 a three-phase current reduction furnace is known which has six electrodes, five of which are arranged in a circle and one in the center of the circle. This arrangement has the disadvantage that, on the one hand, two additional electrodes are used at a slight distance from the wall of the furnace, the electrodes producing a high thermal stressing of the furnace lining and, at the same time, causing a chemical decomposition of the refractory material as a result of the flow of electric current. This decomposition of the refractory material is known, and is indicated by the manufacturers in kg per ampere-hour for the refractory material in question.

SUMMARY OF THE INVENTION

It is thus an object of the invention to improve the utilization of the area of the hearth while simultaneously making the wear of the furnace lining uniform. This object is achieved in accordance with the invention in that the furnace vessel is provided with a first set of electrodes and that in the region between every two first electrodes and the wall of the furnace vessel additional second electrodes are provided which extend parallel to the first electrodes and are connected to the furnace lining. The additional electrodes and two of the first electrodes in the furnace vessel are arranged to form a star-shaped arrangement so that the additional electrodes are herein referred to as "star-point additional electrodes".

By the provision of the star-point additional electrodes, further star-shaped connections are added to the delta connection and star connection, which already exist from the standpoint of a wiring diagram.

The star-point additional electrodes are advantageously arranged in the heretofore little-used region between the furnace wall and every two first electrodes. A part of the electric current will flow from the first electrodes to the star-point additional electrodes. The result thereof is a better distribution of the current in the burden and/or the melt, and thus an improved utilization of the area. The electric current will in this connection no longer be concentrated exclusively in the region of the first electrodes, resulting in a reduction of the chemical action on the refractory material of the furnace wall. The result hereof will be less wear of the furnace and thus lower operating costs, as well as a reduction in the expense for maintenance and higher equipment utilization.

As long as the heating mechanism is not disturbed, the electric reduction furnace can be operated with less power for the same output, resulting in advantages for the electrical and thermal stressing both of the electrodes and of the furnace lining. With the same electric power, there is the possibility of improving the productivity of the electric reduction furnace by increasing the degassing active surface, or further increasing the thermal as well as chemical/physical stressing of already highly stressed areas.

One essential advantage of the distribution of the current caused by the star-point additional electrodes of the invention is the possibility of using burden which, contains fine-grained reducing agents, in addition to the mineral. There can be used advantageously, in particular, briquettes and pellets with carbon bound therein which form current-conducting banks between the electrodes, since further banks, i.e. metallurgically active volumes, are produced by the star-point additional electrodes.

The star-point additional electrode and, in each case, two individual electrodes preferably form a substantially isosceles triangle. In this way, assurance is had that the electrodes are stressed uniformly and the previous dead zone is traversed by current. This applies both to the circular type of construction and to the rectangular furnace. In this way, the volume of the dome is increased when using separated burden, and with pretreated burden of fine-grained material the number of banks is increased.

With open furnaces, the star-point additional electrodes can be fastened to the rim of the furnace vessel. With closed furnaces, the furnace cover can be developed as supporting device for the star-point additional electrodes. With this construction, the current feed has a detachable plug connection. The current feeds can, in structurally simple manner, be conducted from the star-point additional electrode to the star-point, the star-point contact electrode. The construction of the mounts is developed in such a manner that the star-point additional electrodes can be fed in the direction towards the melt.

The star-point contact electrodes are provided in the region of the bottom of the furnace. This assures that, on the one hand, good contact with the melt is obtained via the refractory lining of the furnace bottom and, on the other hand, there are no impediments in the furnace bottom itself for any other metallurgical work. When using three (or more) contact electrodes, they can be arranged in less critical regions of the furnace vessel, namely in the furnace wall just above the bottom of the furnace.

BRIEF DESCRIPTION OF THE DRAWINGS

In the following embodiments of the invention are described with reference to the drawings, in which.

DETAILED DESCRIPTION OF THE PRESENTLY PREFERRED EMODIMENTS

Figure 1:
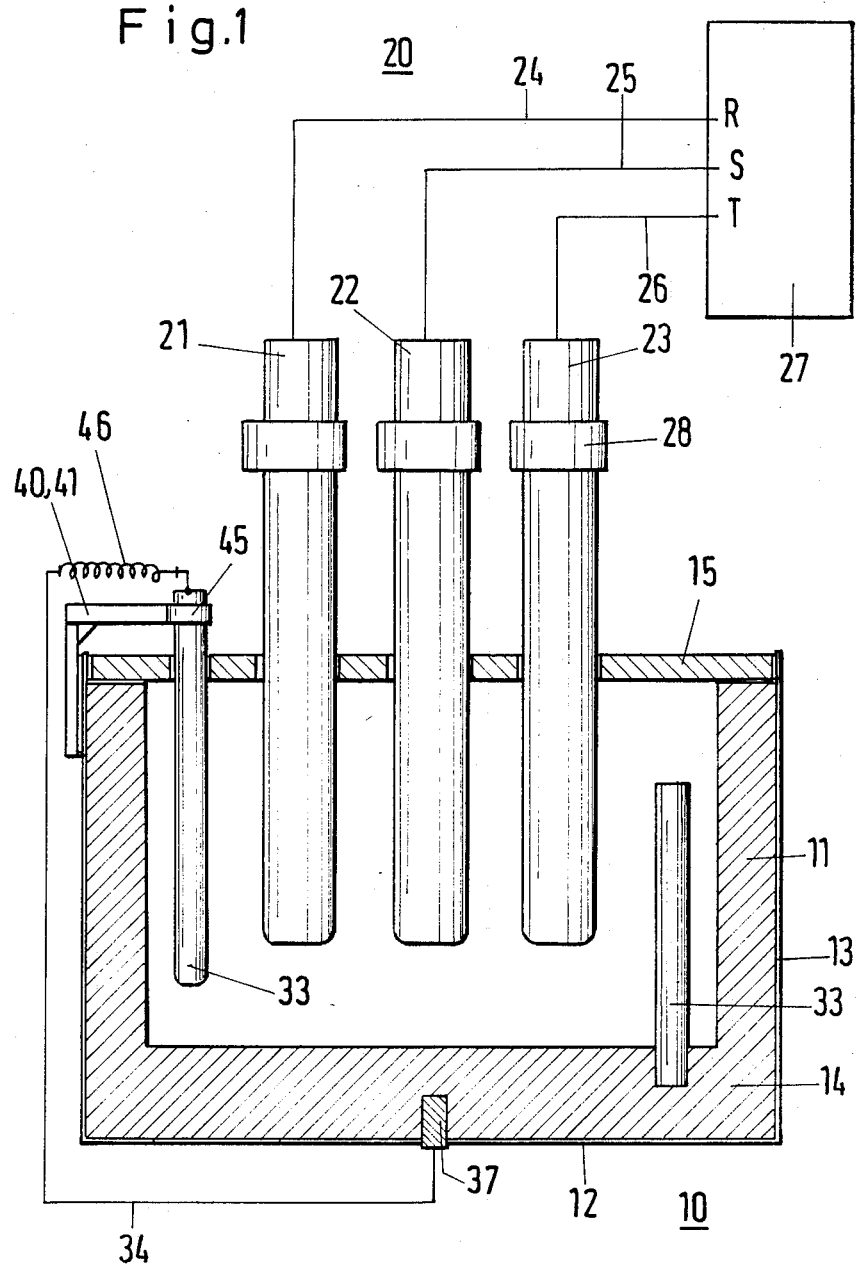
FIG. 1 is a side view of the furnace.

FIG. 1 shows the furnace 10 with the furnace jacket 13. The furnace 10 has the furnace bottom 12 and the furnace wall 11, with the refractory furnace lining 14. The mouth of the vessel is closed by the cover 15.

The first electrodes 20, which are held by the electrode support device 28, extend through the cover 15 into the furnace 10, the electrodes being connected electrically with the power supply unit 27 via the current lines 24 to 26 between the electrodes 21 to 23 and the power supply RST.

In the region between two first electrodes 20 and the furnace wall 11 there are provided second electrodes, so-called star-point additional electrodes 31 to 33, which are electrically connected to the furnace lining 14. The star-point additional electrode 31 shown in the right-hand half of the vessel is directly connected to the furnace lining 14. The star-point additional electrode 33 shown in the left-hand half of the vessel extends into the furnace vessel and is held by the star-point additional electrode mount 40, 41. The star-point additional electrode 33 is electrically connected to the furnace lining 14 via the current line 34 with a third electrode, the star-point contact electrode 37 which extends into the bottom 12 of the furnace.

The adjustment device 45 is provided on the star-point additional electrode mount 40, 41. As a function of the movement of the star-point additional electrode caused by the feed device 45, a current feed 46 which compensates for the path is provided.

Figure 2:
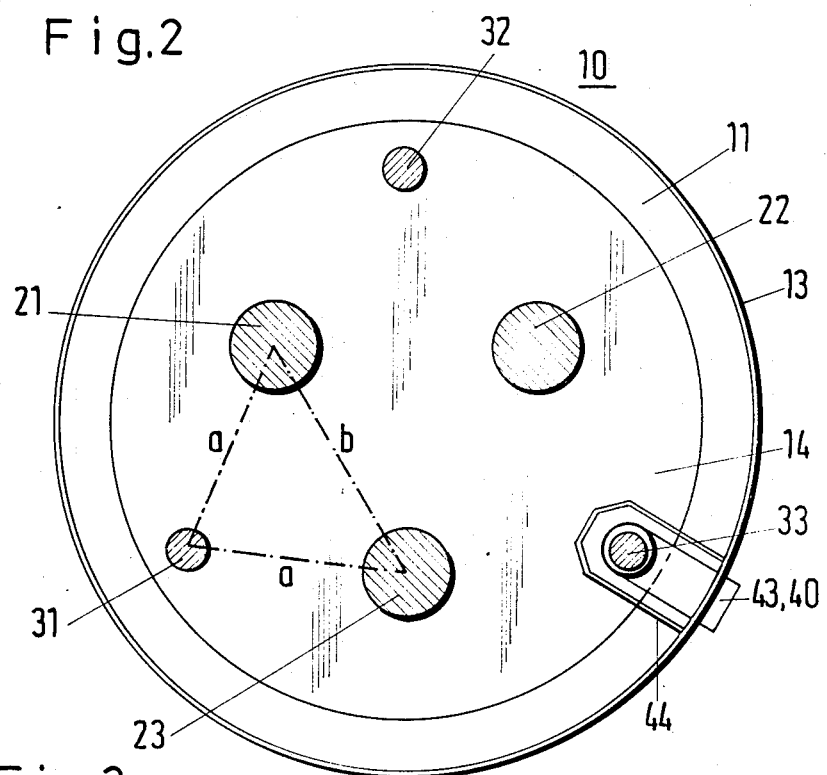
FIG. 2 is a top view of a round furnace vessel.

FIG. 2 shows, in top view, the triangular arrangement aab of the first electrodes 21 to 23 and the star-point additional second electrodes 31 to 33 each forming isosceles triangles. The star-point additional electrode mount (in this case 43) is protected against radiant heat by a heat shield 44.

Figure 3:
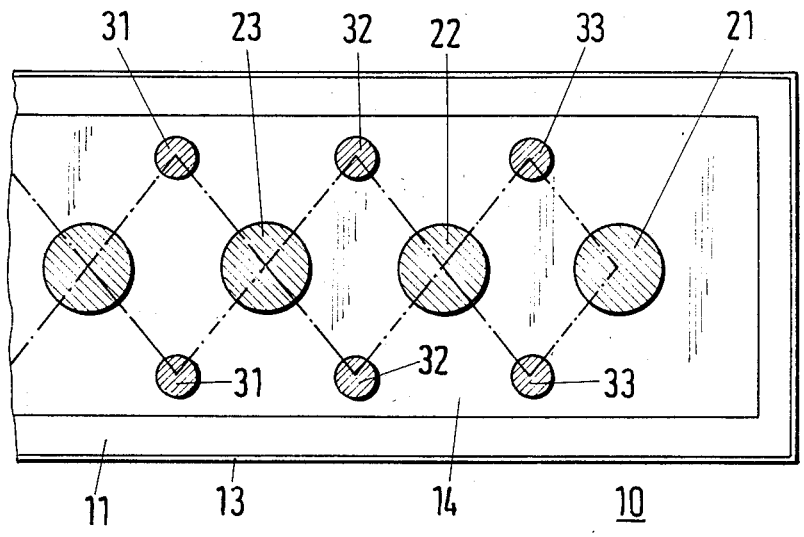
FIG. 3 is a top view of the rectangular furnace vessel.

FIG. 3 shows the arrangement of the star-point additional electrodes 31 to 33 in a rectangular furnace vessel. The electrodes 21 to 23, arranged in series, have star-point additional electrodes 31 to 33 on each side of the row. The furnace 10 has a furnace jacket 13 and a furnace lining 14. The star-point additional second electrodes 31 to 33 are arranged in the region between the electrodes 21 to 23 and the wall 11 of the furnace vessel.

Figure 4:
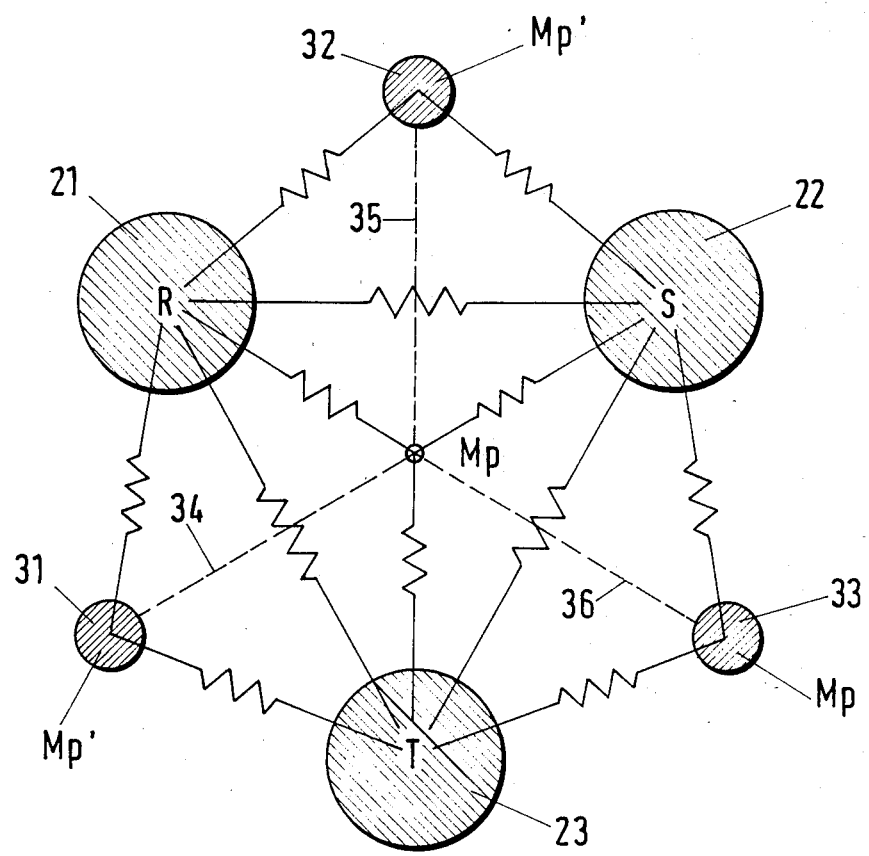
FIG. 4 is a diagram of the different conditions of connection.

FIG. 4 shows the various connection conditions diagrammatically.

The first electrodes 21 to 23 are connected with the melt via domes or banks (not shown). There is a star-shaped connection with the center Mp.

The domes and banks of the individual electrodes 21 to 23 are, however, simultaneously connected to each other. In this case, there is present a delta connection RST (21 to 23).

Bridges or domes will also be formed between the star-point additional second electrodes 31 to 33 on, in each case, two first electrodes 21, 23; 21, 22; 22, 23, so that a delta connection is present here.

The star-point additional electrodes 31 to 33 are connected via current lines 34, 35, 36 to the star-point third contact electrodes (37) which extend into the furnace lining, or they are directly in contact with the furnace bottom (see FIG. 1). From the standpoint of a wiring diagram there is present in this case a star-shaped connection with the center Mp (Mp').

Since these as well as further embodiments and modifications thereto are intended to be within the scope of the present invention, the above description should be construed as illustrative and not in a limiting sense, the scope of the invention being defined by the following claims.

What is claimed is:

1. An electric reduction furnace for connection to a supply of electric current comprising a furnace vessel having a bottom and a wall lined with a refractory lining (14); a plurality of first electrodes (21, 22, 23) for connection to said electric current supply and extending into said furnace vessel; and a plurality of additional second electrodes (31-33) located in the region between every two of said first electrodes (21-22, 22-23, 23-21) and said wall (11) of said furnace vessel, said second electrodes (31-33) extending substantially parallel to said first electrode (21-23) and being electrically connected to said furnace lining (14).

2. The electric reduction furnace according to claim 1, wherein two of said first electrodes (23 and 21, 21 and 22, 22 and 23) and one additional second electrode (31, 32, 33) are arranged in the plane perpendicular to the direction of lowering of said electrodes, forming a substantially isosceles triangle (a, a, b).

3. The electric reduction furnace according to claim 2, additionally comprising means for detachably fastening said additional second electrodes (31, 32, 33) in the bottom (12) of said furnace.

4. The electric reduction furnace according to claim 2, additionally comprising means (41, 42, 43) for mounting said additional second electrodes (31, 32, 33) so that said electrodes extend into said furnace vessel.

5. The electric reduction furnace according to claim 4, additionally comprising a mount (40) for fastening said mounting means (41, 42, 43) for said additional second electrodes.

6. The electric reduction furnace according to claim 5, additionally comprising a furnace cover (15) and wherein said mount (40) is said cover (15).

7. The electric reduction furnace according to claim 4, additionally comprising a furnace jacket (13) surrounding said furnace and wherein said mounting means (41 to 43) is fastened on said furnace jacket (13).

8. The electric reduction furnace according to claim 7, wherein the side of said mounting means (41 to 43) facing the furnace bottom (12) comprises a heat shield (44).

9. The electric reduction furnace according to either claim 6 or 8, wherein said mounting means (41 to 43) on the side facing away from the furnace bottom (12) comprises means (45) for adjusting said second electrodes.

10. The electric reduction furnace according to claim 1, additionally comprising a third contact electrode (37) and means (34, 35, 36) located outside said furnace vessel for electrically connecting said second electrodes (31, 32, 33) to said third contact electrode (37).

11. The electric reduction furnace according to claim 10, wherein said third contact electrode (37) is located in the bottom (12) of the furnace.

12. The electric reduction furnace according to claim 11, additionally comprising means (46) for feeding current to said second electrodes mounted on said adjustment means (45) and wherein said electric lines (34 to 36) are connected to said current feeding means (46).

* * * * *